United States Patent [19]

Hatch

[11] 4,168,445
[45] Sep. 18, 1979

[54] OFFSET LIQUID METAL STORAGE METHOD AND MEANS

[75] Inventor: Burton D. Hatch, Ballston Lake, N.Y.

[73] Assignee: The United States of America as represented by the Secretary of the Navy, Washington, D.C.

[21] Appl. No.: 882,297

[22] Filed: Feb. 28, 1978

[51] Int. Cl.² ............................................. H02K 13/00
[52] U.S. Cl. ....................................... 310/219; 310/187
[58] Field of Search ............... 310/219, 232, 178, 112, 310/52, 114, 11, 10; 417/50; 339/5 L, 8 L

[56] References Cited

U.S. PATENT DOCUMENTS

| 3,293,470 | 12/1966 | Polgreen | 310/178 |
| 3,604,967 | 9/1971 | Krulls | 310/178 |
| 3,831,049 | 8/1974 | Korotenko | 310/178 |
| 3,989,968 | 11/1976 | Hatch | 417/50 |
| 4,027,183 | 5/1977 | Hatch | 310/219 |
| 4,027,184 | 5/1977 | Hurley | 310/219 |
| 4,088,911 | 5/1978 | Wetzig | 310/52 |

FOREIGN PATENT DOCUMENTS

| 2409796 | 9/1974 | Fed. Rep. of Germany | 310/178 |
| 2414088 | 10/1974 | Fed. Rep. of Germany | 310/178 |
| 2420046 | 11/1975 | Fed. Rep. of Germany | 310/178 |

Primary Examiner—R. Skudy
Attorney, Agent, or Firm—R. S. Sciascia; L. I. Shrago; C. E. Vautrain, Jr.

[57] ABSTRACT

An offset or asymmetrical self-contained liquid metal current collector for acyclic or homopolar electrical generators or motors is provided which includes a narrow annular volume on one side and a wide annular volume on the other side of the collector disc. Selectively positioned circular troughs effectively communicate with each other so that the liquid metal is trapped and retained when the rotating speed of the disc is too low to centrifugally maintain the liquid metal at the outer periphery of the disc.

3 Claims, 3 Drawing Figures

OFFSET LIQUID METAL STORAGE METHOD AND MEANS

The present invention concerns machines using liquid metal for electrical contact between a collector disc and its mating ring and, more particularly, providing such contact to assure retention of the liquid metal at the collector site by sufficient centrifugal forces in the rotating liquid to overcome the electrical expulsion forces generated in the machine.

In order to obtain superconducting electric motors and generators having high efficiency, small volume, and low weight, it is necessary to utilize liquid metal current collection in an unflooded construction configuration. In machines of this type, the current is transferred between the rotor and the stator by means of a brush consisting of a disc mounted on the rotor revolving in a channel in the stator which contains liquid, typically a sodium-potassium eutectic NaK-78 or NaK.

In any practical machine, it is necessary to utilize multiple current carrying members on the rotor in order to obtain reasonable terminal voltages and good flux utilization which use necessitates the employment of multiple brushes which are necessarily adjacent to each other. To avoid shorting out the machine, the NaK must be contained within each individual brush site. Electromagnetic Lorentz forces acting on the liquid metal tend to expel the NaK from the brush site under certain conditions and hydrodynamic forces may cause the liquid metal to migrate between brush sites. The present invention is directed to a method and means for overcoming these and other problems entailed in the use of liquid metal for current collection.

Accordingly, it is an object of the present invention to provide improved stability of the current carrying capability of liquid metal current collectors in acyclic drum and other machines in their low speed ranges.

Another object of this invention is to provide a method and means for substantially reducing the differential head across the rotor in superconducting electric motors and generators utilizing liquid metal for current collection.

A further object of this invention is to provide an improved current carrying capability in liquid metal current collectors by means of which a maximum useful centrifugal force is achieved using a minimum quantity of liquid metal in machine ranges in which the rotational speeds are sufficient to develop adequate centrifugal forces.

Other objects, advantages and novel features of the invention will become apparent from the following detailed description thereof when considered in conjunction with the accompanying drawings in which like numerals represent like parts throughout and wherein.

The present invention, in general, provides an asymmetrical configuration of a liquid metal current collector ring rotating with respect to a stationary collector ring which assures retention of the liquid metal at the electrical collector site by incorporating circular troughs in both the rotor and stator which overlap and cooperate with one another. The troughs provide annular volumes at the sides of the collector discs so that the local supply of liquid metal is trapped and retained within each individual collector volume when the rotating speed of the disc is too low to centrifugally maintain the liquid metal at the outer periphery of the rotating collector disc.

The advantages of liquid metal collector rings lie primarily in the much higher current density that can be carried, e.g. 3,000 to 10,000 amperes per square inch, by the liquid metal as compared to 50 to 100 amperes per square inch in conventional carbon brushes, and that as compared to the approximately one (1) volt voltage drop across conventional carbon brushes, the voltage drop across the brush site is reduced to a few microvolts by the use of properly made liquid metal collectors. Electrical resistance losses are correspondingly reduced.

Present collector configurations in commercial use are directed to continuously removing liquid metal from each individual collector site to cool and purify the liquid metal, and to continual replenishment through electrically insulated, external sets of pipes, heat exchanges, etc. The present invention provides a current collector in which the needed quantity of liquid metal for the external collector ring is placed and retained in the collector region which thus becomes self-contained and does not require continual extraction and withdrawal from the retainer to the collector.

Figure 1:
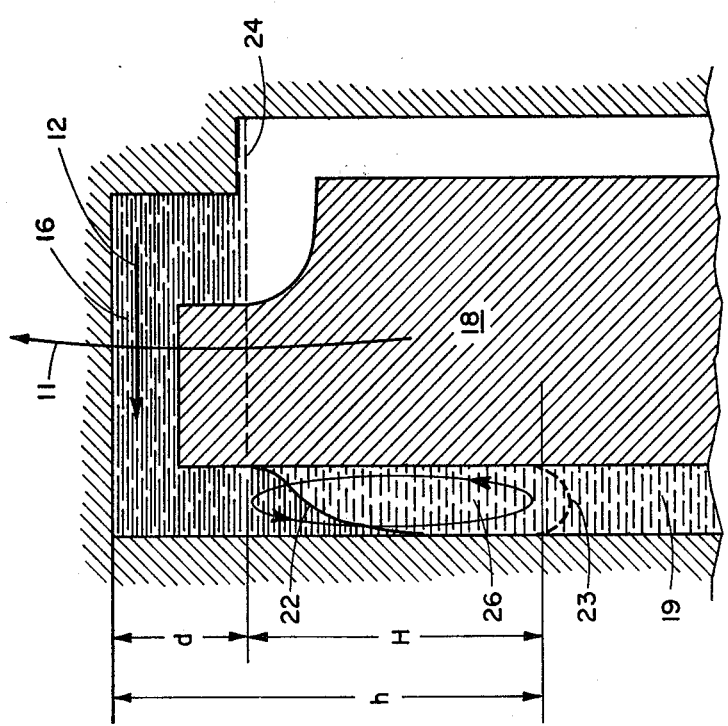
FIG. 1 is a schematic illustration of the current path through the collector gap and the resultant forces created.

Referring to the drawings, FIG. 1 shows the portion of armature current I through the collector gap, indicated at 11, and the direction of the resultant expulsion force P, indicated by arrow 12, together with the centrifugal hydraulic head, indicated at h, which successfully retains liquid metal in the collector gap with higher machine speeds. The armature current running in the circuit through the collector gap and the liquid metal induces a magnetic field which acts upon the liquid metal electrical conductor 15 in gap 16 between a rotor disc 18 and a stator 19. The liquid metal level during operation at low speeds without the features of the invention is indicated at 22 while the liquid at operating speeds is substantially within the lines indicated at 23 and 24. Depending upon the speed of disc 18, there is a specific height, $H = h - d$, of liquid metal in the liquid retention area indicated at 26 at which the centrifugal forces on the liquid metal in this area will be sufficient to counterbalance the expulsion force and maintain the liquid metal in the area indicated at 23-24.

Figure 2:
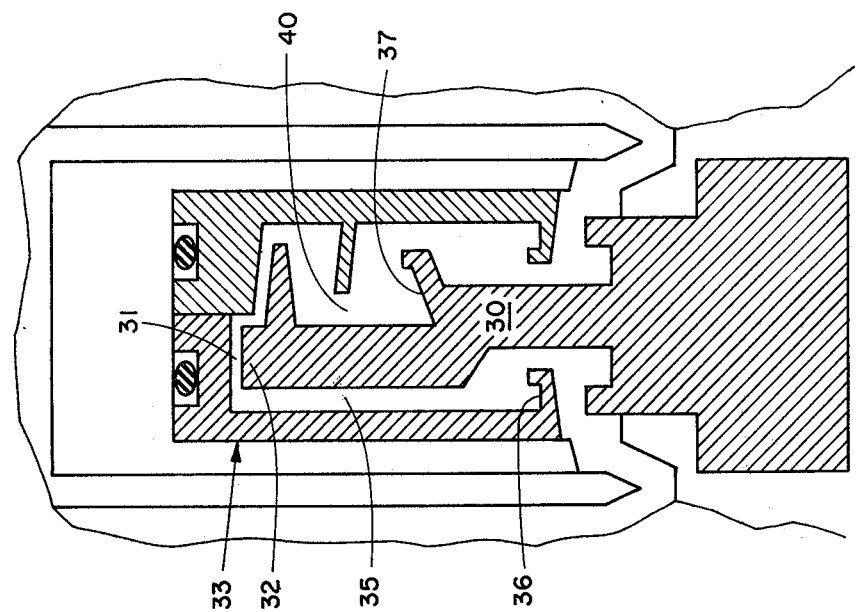
FIG. 2 is a sectional view of a portion of an acyclic machine showing the liquid metal current collector of the present invention.

FIG. 2 illustrates a preferred embodiment of the invention wherein a rotor disc 30 is specifically formed to retain liquid metal in a collector gap 31 at such low operating speeds where otherwise liquid metal would normally leave this area. A salient collector head 32 of disc 30 is offset from an encompassing stator collector 33 a small amount. A lateral gap, on the order of 0.040 inches in this embodiment, is provided in the liquid metal retention area indicated at 35 to provide the counterbalancing centrifugal force. When rotor 30 is stationary, the liquid metal will drop to the bottom of a pair of cooperating opposed channels 36 and 37 in the lower disc and stator levels, respectively. A larger volume of liquid metal will collect at 40 which volume must be sufficient to store the principal portion of the total amount of liquid metal required by each individual collector without spilling over into adjacent collectors.

Such spilling over, of course, would electrically connect consecutive conductors and short out the machine.

All of the surfaces of disc 30 along the liquid metal channels at either side thereof in the area indicated at 35 and 40 are preferably coated with an electrical insulating material, not shown. This material confines the Lorentz expulsion forces to the collector side region 31. The narrow area at 35 provides the necessary height for the development of sufficient centrifugal forces while requiring a minimum quantity of liquid metal to do so, and the side area at 40 provides adequate storage volume to retain this minimum quantity of liquid metal even when the rotor is stationary or when there is a pitch to the center line of the motor shaft.

Figure 3:
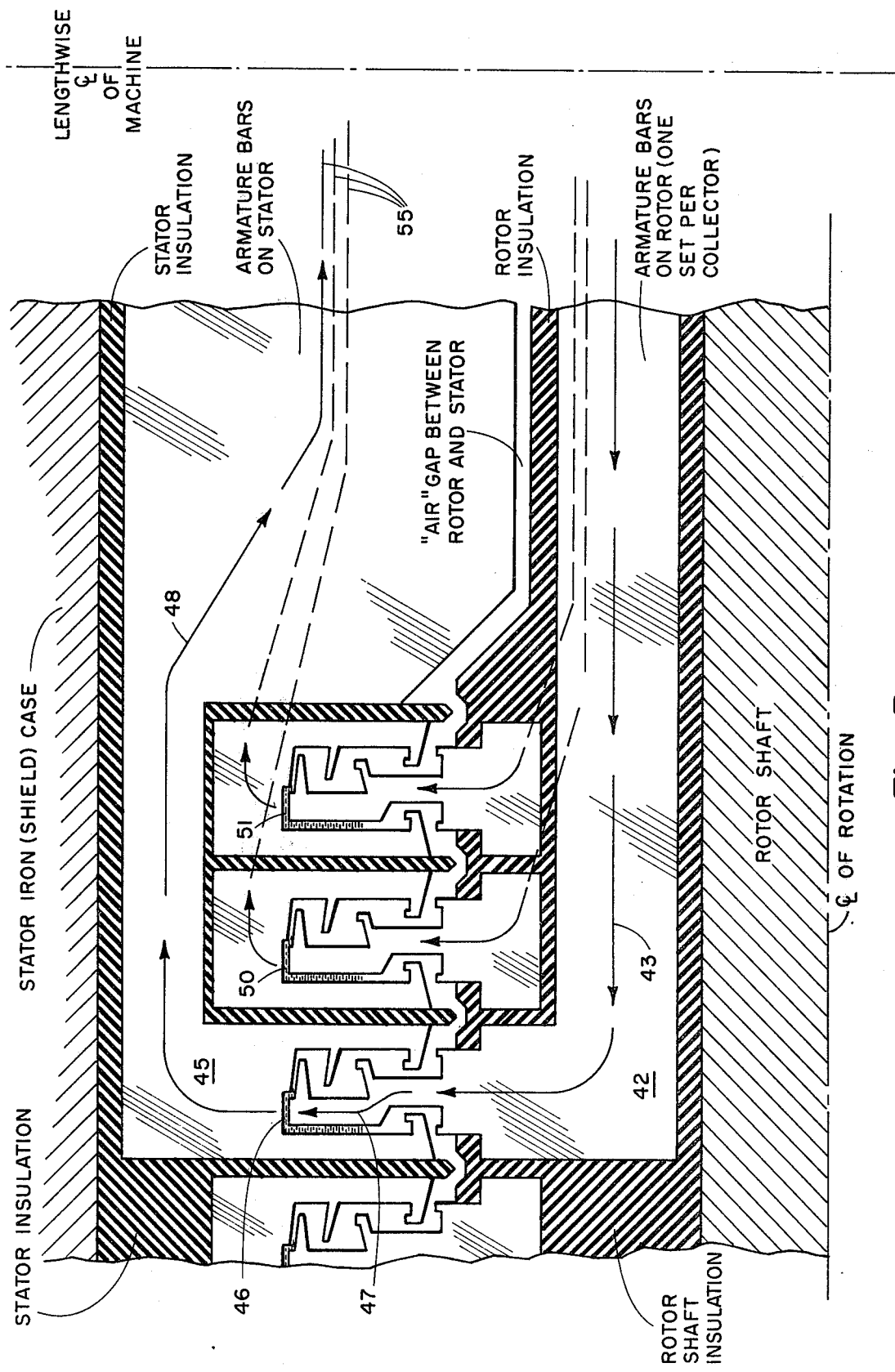
FIG. 3 is an enlarged sectional view of the collector region between a single stator and rotor.

FIG. 3 shows the liquid metal storage concept of the invention installed in an acyclic machine. Armature current enters a cylindrical rotor 42 at a point not shown and moves axially therethrough in the direction indicated by arrow 43 to a cylindrical stator 45 through liquid metal in a liquid metal collector region 46 in a direction indicated by arrow 47 and thereafter through stator 45 in the direction indicated by arrow 48 and back to rotor 42 at the opposite end of the motor, not shown. Both rotor 42 and stator 45 are typically made of copper while the liquid metal may typically be NaK-78 or NaK. The main flux field extends radially outward from the center of the machine and thus is in a direction perpendicular to that of the current travel indicated by arrows 43 and 48. A second magnetic field is generated by the armature current flowing in the circuit through successive liquid metal collectors 46, 50 and 51, this field being that which acts upon the liquid metal conductor as shown in FIG. 1.

There is thus provided a new and novel means for liquid metal retention in a self-contained collector for an acyclic drum type machine. The novel offset means provides for a radial, gravitational and centrifugal force activated column or head height, H, of liquid metal which furnishes an opposing pressure to overcome unbalanced axial pressure in the liquid metal at the collector sites. This pressure retains the liquid metal in its proper location, using a minimum practical amount of liquid metal, while still providing an adequate storage volume for the liquid metal in each collector when the motor is stationary, i.e. not rotating. The electrical circuit of the motor armature, as seen in FIG. 3, is from rotor conductor 42 through regions 46, 50 and 51 thence along the return path indicated at 55 for as many turns as are formed in the machine.

What is claimed is:

1. In an acyclic machine having a superconducting electric motor which uses liquid metal for current collection and wherein Lorentz and centrifugal forces act to expel the liquid metal from the collector regions, the improvement comprising:
    a stator and a multiple collector disc rotor having liquid metal retaining means;
    a multiplicity of salient collector heads in each rotor disc with each collector head terminating in a separate collector region,
        said liquid retaining means including a narrow annular static head volume formed by radially extending adjacent surfaces on one side of said rotor and the stator and a substantially wider annular storage volume formed between the rotor and stator on the opposite side of said rotor from said narrow annular volume;
        troughs in said stator and rotor adjacent said annular volume for trapping liquid metal;
    means insulating the surfaces forming said annular volumes to confine Lorentz expulsion forces to the collector regions,
        said narrow annular volume extending radially a sufficient distance from each collector region to develop centrifugal forces adequate to retain liquid metal therein and said wider annular volume sufficient to retain the minimum quantity of liquid metal at the outer periphery of each rotor collector disc when the rotor is stationary or when there is a pitch to the machine,
        said collector heads offset in the direction of said narrow annular volume at said one side and having at least two counterbalancing annular projections extending generally transversely from said opposite side,
        one of said projections forming an extended collector region along the inner periphery of said stator and another of said projections forming said rotor trough,
        said projections counterbalancing the offset portion of said collector heads,
        said stator including an annular recess for receiving said rotor projections; and
    at least two annular projections extending generally transversely toward said opposite side of said rotor,
        one of said projections extending between said rotor projections to collect and impede the flow of liquid metal away from said collector region,
        the other of said projections forming a gutter substantially opposite said stator trough to preclude collector region liquid metal from short circuiting current to said rotor.

2. A system for overcoming the electrical expulsion forces generated in machines using liquid metal for current collection comprising:
    a stator collector ring having spaced armature bars thereon;
    a rotor shaft having spaced armature bars mounted thereon for rotation with respect to said stator ring,
        said rotor bars each having a salient collector head and a conforming recess in said stator ring for accommodating said collector heads,
        said collector heads and stator ring forming respective liquid metal current collector regions at the periphery of said collector heads;
    a supply of liquid metal in each of said collector regions sufficient in volume to maintain liquid metal therein when the rotor is stationary and when there is a pitch to the machine;
    means insulating the radially extending surfaces of said recess and said collector heads to confine Lorentz expulsion forces to the collector heads;
    substantially axially extending interleaving gutters on said stator and rotor bars within said recess for trapping and retaining the liquid metal when said rotor is rotating at speeds lower than that necessary to centrifugally maintain the liquid metal in said collector regions,
        said recess and said collector heads forming a narrow annular static head volume at one face of said heads and a substantially wider annular storage volume at the face opposite said one face;
    at least two additional sets of collector heads aligned with and electrically insulated from said rotor bars and additional respective stator rings and recesses aligned with said stator ring to form additional armature current paths in said machines, said collector heads offset in the direction of said narrow annular volumes and having at least two annular projections extending generally transversely from said opposite face, one of said projections forming extended collector regions along the inner periphery of said stator rings and another of said projections forming a rotor trough, said projections counterbalancing the offset portions of said collector heads.

3. The system as defined in claim 2 and further including at least two annular projections extending generally transversely from said stator rings toward said opposite face of said collector heads, one of said stator projections extending between said collector head projections to collect and impede the flow of liquid metal away from said collector regions, the other of said projections forming gutters substantially opposite said stator trough to preclude collector region liquid metal from short circuiting current to said rotor.

* * * * *